United States Patent
Shaikh et al.

(10) Patent No.: US 8,904,472 B2
(45) Date of Patent: Dec. 2, 2014

(54) VALIDATION OF CONSISTENCY AND COMPLETENESS OF ACCESS CONTROL POLICY SETS

(76) Inventors: Riaz Ahmed Shaikh, Hull (CA); Kamel Adi, Gatineau (CA); Luigi Logrippo, Ottawa (CA); Serguei Mankovskii, Toronto (CA)

(*) Notice: Subject to any disclaimer, the term of this patent is extended or adjusted under 35 U.S.C. 154(b) by 794 days.

(21) Appl. No.: 12/945,642

(22) Filed: Nov. 12, 2010

(65) Prior Publication Data
US 2012/0124639 A1    May 17, 2012

(51) Int. Cl.
G06F 17/00    (2006.01)
G06F 21/60    (2013.01)

(52) U.S. Cl.
CPC ............................ *G06F 21/604* (2013.01)
USPC .......... 726/1; 726/2; 726/3; 726/27; 713/182; 709/225

(58) Field of Classification Search
USPC ................... 726/1–3, 27; 713/182; 709/225
See application file for complete search history.

(56) References Cited

U.S. PATENT DOCUMENTS

| | | | | |
|---|---|---|---|---|
| 8,010,624 B2* | 8/2011 | Scott et al. | | 709/217 |
| 2004/0254768 A1* | 12/2004 | Kim et al. | | 702/189 |
| 2005/0204028 A1* | 9/2005 | Bahl et al. | | 709/223 |
| 2007/0011184 A1* | 1/2007 | Morris et al. | | 707/101 |
| 2007/0136250 A1* | 6/2007 | Lindblad et al. | | 707/3 |
| 2008/0134268 A1* | 6/2008 | Sun et al. | | 725/114 |
| 2008/0134286 A1* | 6/2008 | Amdur et al. | | 726/1 |
| 2009/0119746 A1* | 5/2009 | Allen et al. | | 726/1 |
| 2009/0157686 A1* | 6/2009 | Idicula et al. | | 707/9 |
| 2009/0313367 A1* | 12/2009 | Alon et al. | | 709/223 |
| 2010/0125539 A1* | 5/2010 | Aucouturier et al. | | 706/12 |
| 2012/0251002 A1* | 10/2012 | Gotoh et al. | | 382/173 |

OTHER PUBLICATIONS

Shaikh, Riaz Ahmed, et al., "Detecting Incompleteness in Access Control Policies Using Data Classification Schemes", *Proceedings of the 5th International Conference on Digital Information Management (ICDIM 2010)*, IEEE, Jul. 2010, pp. 417-422.
Shaikh, Riaz Ahmed, et al., "Inconsistency Detection Method for Access Control Policies", *Proceedings of the 6th International Conference on Information Assurance and Security (IAS 2010)*, Aug. 2010, pp. 204-209.
Shaikh, Riaz Ahmed, et al., "Access Control Policies Validation Scheme", preprint submitted to Elsevier, Aug. 20, 2010, pp. 1-24.

* cited by examiner

*Primary Examiner* — Beemnet Dada
*Assistant Examiner* — Kidest Mendaye
(74) *Attorney, Agent, or Firm* — Pillsbury Winthrop Shaw Pittman LLP (57) ABSTRACT

Consistency and/or completeness of access control policy sets may be validated and/or verified. An access control policy set may be received. The access control policy set may include access control policies that allow or disallow access to computing resources. Individual ones of the access control policies may include one or more attributes. The one or more attributes of a given access control policy may be ordered into a predetermined order responsive to the one or more attributes of the given access control policy lacking the predetermined order. A decision tree may be generated based on the access control policies. The decision tree may be analyzed to determine one or more of (1) whether one or more of the access control policies are incomplete, or (2) whether one or more of the access control policies are inconsistent with one or more other ones of the access control policies.

20 Claims, 3 Drawing Sheets

VALIDATION OF CONSISTENCY AND COMPLETENESS OF ACCESS CONTROL POLICY SETS

FIELD OF THE DISCLOSURE

This disclosure relates to validation and/or verification of consistency and/or completeness of an access control policy set.

BACKGROUND

A general purpose of access control is to allow access to a computing resource to individuals that are allowed access to it and deny access to individuals that are not allowed access. In contemporary IT infrastructure, access control is not a trivial task. Access control policies define different roles for individuals accessing computing resources. Access control policies may depend on time of access, location of access, and/or other contextual data. In conventional approaches to access control, a set of access control policies may contain policies that allow and deny access to the same resource at the same time, or some resources may not have enough policies describing access to them for all possible individuals. Prior attempts to resolve these issues include using methods based on formal logic. Methods based on formal logic can suffer, for example, from exponential growth of computational complexity and difficulties with representing time. As such, methods based on formal logic may not be feasible for policy sets containing a large amount of variables and/or time-based policies.

SUMMARY

One or more implementations of the present technology may overcome or alleviate issues associated with conventional approaches to access control such as, for example, exponential growth of computational complexity and difficulties with representing time. More specifically, some implementations may accommodate high computational complexity and very large policy sets, handle continuous values (e.g., time, resource demand, and/or other continuous values), utilize existing off-the-shelf and/or proprietary data mining algorithms, provide enhanced compactness in sets of policies, and/or other advantages over conventional approaches to access control.

One aspect of the present technology relates to a system configured to validate and/or verify consistency and/or completeness of an access control policy set, in accordance with one or more implementations. The system may include computing resources, a policy database, a policy validation computing platform, and/or other components, which may be communicatively coupled via a network.

The computing resources may include "hard" and/or "soft" resources. Examples of hard resources may include clients, servers, devices, and/or other tangible computing resources. Examples of soft resources may include documents, records, directories, and/or other non-tangible computing resources. The computing resources may include individual resources and/or groups or sets of resources. Individual ones of the computing resources may have an identity and/or may require access permission. Individual groups of one or more computing resources may have an identity and/or may require access permission.

The policy database may be configured to store access control policies associated with the computing resources. It is noteworthy that access control policies may also be referred to as "policies" or "rules." Access control policies stored by the policy database may be accessed and/or manipulated by one or more other components of the system. In some implementations, the policy database may be included within the policy validation computing platform.

Generally speaking, access control policies may be described as collections of attributes. In some implementations, such collections may be described as ordered collections. An individual attribute may represent some feature of a particular access control policy. An attribute may include one or more discrete values, continuous values, default values, and/or other values. Examples of attributes may include subject, location, time, and/or other attributes of an access control policy. One or more access control policies may be included in an access control policy set. According to some implementations, access control policies included in a given access control policy set may have a uniform structure. Each policy in an access control policy set may belong to one of a set of mutually exclusive classes. Such classes may include classes of permission, action, and/or other classes. Attributes of a permission class may include "Allowed," "Denied," and/or other permission class attributes. Attributes of an action class may include "Read," "Write," "Update," "Delete," and/or other action class attributes. For an individual set of computing resources, a policy administrator may define non-categorical attributes. Non-categorical attributes may represent one or more subjects (e.g. Doctor and/or Alice), context (e.g. location and/or time), and/or other non-categorical information. Individual sets of computing resources may include different non-categorical attributes.

The policy validation computing platform may be configured to validate and/or verify consistency and/or completeness of an access control policy set, in accordance with one or more implementations. Such an access control policy set may be associated with one or more of the computing resources and may be stored by the policy database. The policy validation computing platform may include a user interface, electronic storage, one or more processors, and/or other components.

The user interface may provide an interface between the system and one or more users (e.g., policy administrator). The user interface may enable data, results, and/or instructions and any other communicable items, collectively referred to as "information," to be communicated between the user and the system. In some implementations, the user interface includes a plurality of separate interfaces.

The electronic storage may comprise electronic storage media that electronically stores information. The electronic storage media of the electronic storage may include one or both of system storage that is provided integrally (i.e., substantially non-removable) with the policy validation computing platform and/or removable storage that is removably connectable to the policy validation computing platform. The electronic storage may store software algorithms, information determined by the processor(s), information received from the user interfaces, information received from other resources and/or components of the system, and/or other information that enables the system to function as described herein.

The processor(s) may be configured to provide information processing capabilities in the policy validation computing platform. The processor(s) may be configured to execute one or more computer program modules. The one or more computer program modules may include one or more of a policy import module, a parser module, a transformation module, a decision tree module, an anomaly detection module, a remediation module, and/or other modules.

The policy import module may be configured to import and/or otherwise receive access control policies. Access control policies may be imported and/or otherwise received from the policy database. According to some implementations, access control policies received by the policy import module may require some level of formatting. Such formatting may include ordering attributes, transforming Boolean expressions, and/or other formatting.

The parser module may be configured to parse a set of access control policies. According to some implementations, such parsing may be based on non-categorical attributes. As mentioned above, policies may be described as ordered collections of attributes. Ordering of attributes may be necessary when a policy set is not given in tabular form. For example, in some implementations, policies may be imported from the policy database in extensible markup language (XML) form and/or other non-tabular forms. In such implementations, the parser module may be configured to determine the attributes and the corresponding attribute values from an imported XML file, and place those attributes in an ordered form. The ordered form may include a tabular structure or form, which may be used as input for the decision tree module.

A policy administrator may specify one or more contextual conditions on one more attributes. Examples of contextual conditions may include location, time, and/or other contextual conditions. Privileges may be granted when all such contextual conditions are satisfied. In an access control policy, contextual conditions may be defined as a Boolean expression. As noted above, policies may be defined in terms of attributes. Subject, action, object, and/or other attributes may be represented as independent attributes. A Boolean expression, however, may be composed of multiple attributes. Relationships between multiple attributes may be defined using logical operators such as AND, OR, and/or other logical operators.

The transformation module may be configured to transform Boolean expressions into a normalized form. Examples of normalized forms may include a disjunctive normal form and/or other normalized forms associated with Boolean logic. A disjunctive normal form is a standardization of a logical formula that is a disjunctive of conjunctive clauses. In order to represent a Boolean expression in a decision tree, according to some implementations, the Boolean expression may first be transformed into a disjunctive normal form. This may be due to the fact that a decision tree that is generated with using a data classification algorithm naturally encodes a disjunctive normal form tautology.

The decision tree module may be configured to generate a decision tree. Such a decision tree may be generated based on tabular policy data from the parser module and/or the transformation module, and/or other data. According to some implementations, a process of decision tree creation may start with a single node representing all data. If all cases in a data set belong to the same class, then the node may become a leaf labeled with a class label. Otherwise, an algorithm may select an attribute according to the following criteria: (1) for each attribute A, find the normalized information gain from splitting on A; (2) let $A_{best}$ be the attribute with the highest normalized information gain; (3) create a decision node that splits on $A_{best}$; and (4) recur on the sub-lists obtained by splitting on $A_{best}$, and add those nodes as children of current node.

The anomaly detection module may be configured to detect one or more anomalies (e.g., inconsistencies and/or incompleteness) in an access control policy set. To do this, the anomaly detection module may be configured to identify one or more policies from a decision tree and assign an accuracy value to individual policies. According to some implementations, the anomaly detection module may apply one or more algorithms to a given decision tree to detect inconsistencies and/or incompleteness in access control policies. It is noteworthy that, in a decision tree, each branch b, (from the root to a terminal node) may represent one policy.

Anomalies (e.g., inconsistency and/or incompleteness) may be detected by the anomaly detection module, in some implementations, by analyzing the terminal nodes of a decision tree. As mentioned above, in a decision tree, each branch (from the root to a terminal node) represents one policy. If a terminal node exactly contains one class attribute (i.e., Allowed or Denied), then the accuracy value of the corresponding policy is one. If a terminal node does not contain any class attribute, then the accuracy value of the corresponding policy is zero. If more than one class attribute exists at a single terminal node, then the accuracy value may be calculated as described further herein.

The specific conflicting policies in the access control policy set may be identified. All of the attributes of a given policy, except class attributes (e.g., permission and/or action), may be fetched. The access control policy set may be scanned to identify the policies in the access control policy set that contain the attributes of the given policy. If the accuracy value of an identified policy is zero, no explicit policy may be defined in specific context for a particular subject. Information about that subject and context associated with that subject may be fetched from the given policy.

The remediation module may be configured to provide results of the anomaly detection module for presentation to a policy administrator. The results of the anomaly detection module may be presented to the policy administrator via the user interface. In some implementations, inconsistent and/or incomplete policies may be highlighted or otherwise emphasized when presented to the policy administrator. The remediation module may be configured to facilitate remediation of inconsistencies and/or incompleteness of policies in the access control policy set. Inconsistencies and/or incompleteness of policies in the access control policy set may be remediated via the user interface. Remediation may include completing an incomplete policy, making inconsistent policies consistent with other policies, and/or other remediation measures.

Another aspect of the present technology relates to a method for validating and/or verifying consistency and/or completeness of access control policy sets, in accordance with one or more implementations. The method may include receiving an access control policy set. The access control policy set may include access control policies that allow or disallow access to computing resources. Individual ones of the access control policies may include one or more attributes. The method may include ordering the one or more attributes of a given access control policy into a predetermined order responsive to the one or more attributes of the given access control policy lacking the predetermined order. The method may include generating a decision tree based on the access control policies. The method may include analyzing the decision tree. The decision tree may be analyzed to determine one or more of (1) whether one or more of the access control policies are incomplete, or (2) whether one or more of the access control policies are inconsistent with one or more other ones of the access control policies. The method may include providing, for presentation to a policy administrator, one or more of the access control policies for remediation. The one or more access control policies may be provided for remediation responsive to one or more of (1) a positive determination that one or more of the access control policies are incomplete, or (2) a positive determination that one or more of the access control policies are inconsistent with one or more other ones of the access control policies.

These and other features and advantages of the present technology will be apparent through the detailed description and the drawings attached hereto. It is also to be understood that both the foregoing general description and the following detailed description are exemplary and not restrictive of the scope of the technology.

DETAILED DESCRIPTION

One or more implementations of the present technology may overcome or alleviate issues associated with conventional approaches to access control such as, for example, exponential growth of computational complexity and difficulties with representing time. More specifically, some implementations may accommodate high computational complexity and very large policy sets, handle continuous values (e.g., time, resource demand, and/or other continuous values), utilize existing off-the-shelf and/or proprietary data mining algorithms, provide enhanced compactness in sets of policies, and/or other advantages over conventional approaches to access control.

Figure 1:
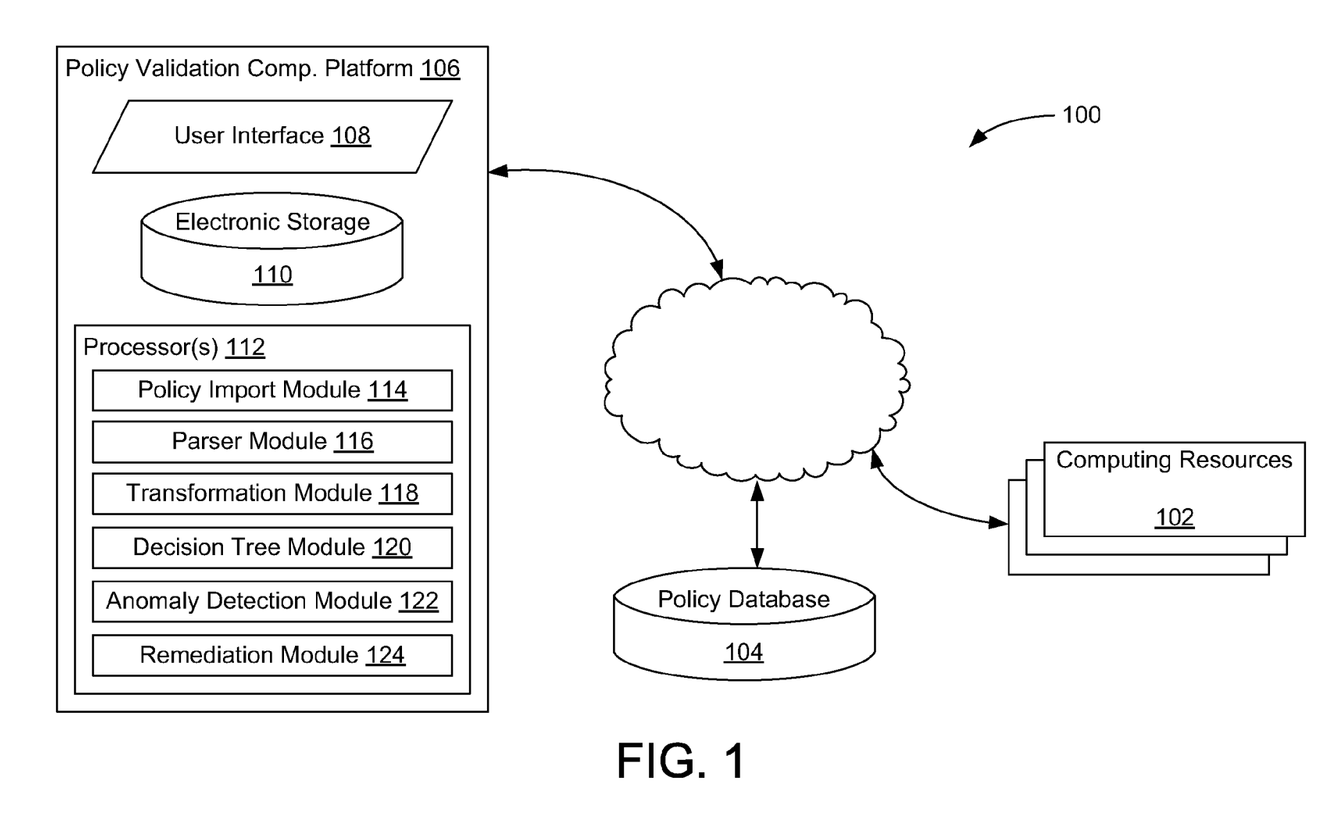
FIG. 1 illustrates a system configured to validate and/or verify consistency and/or completeness of an access control policy set, in accordance with one or more implementations.

Referring now to the figures, FIG. 1 illustrates a system 100 configured to validate and/or verify consistency and/or completeness of an access control policy set, in accordance with one or more implementations. As depicted in FIG. 1, the system 100 may include computing resources 102, a policy database 104, a policy validation computing platform 106, and/or other components, which may be communicatively coupled via a network. The network may include the Internet and/or other networks. It is appreciated that this is not intended to be limiting, and that the scope of this disclosure includes implementations in which the computing resources 102, the policy database 104, the policy validation computing platform 106, and/or other components are operatively linked via some other communication media.

The computing resources 102 may include "hard" and/or "soft" resources. Examples of hard resources may include clients, servers, devices, and/or other tangible computing resources. Examples of soft resources may include documents, records, directories, and/or other non-tangible computing resources. The computing resources 102 may include individual resources and/or groups or sets of resources. In a hospital scenario, for example, resource sets may include medical records, employee records, medical laboratory data, and/or other computing resources associated with the hospital. Individual ones of the computing resources 102 may have an identity and/or may require access permission. Individual groups of one or more computing resources 102 may have an identity and/or may require access permission.

The policy database 104 may be configured to store access control policies associated with the computing resources 102. It is noteworthy that access control policies may also be referred to as "policies" or "rules." Access control policies stored by the policy database 104 may be accessed and/or manipulated by one or more other components of the system 100. In some implementations, the policy database 104 may be included within the policy validation computing platform 106.

Generally speaking, access control policies may be described as collections of attributes. In some implementations, such collections may be described as ordered collections. An individual attribute may represent some feature of a particular access control policy. An attribute may include one or more discrete values, continuous values, default values, and/or other values. Examples of attributes may include subject, location, time, and/or other attributes of an access control policy. One or more access control policies may be included in an access control policy set. According to some implementations, access control policies included in a given access control policy set may have a uniform structure. Each policy in an access control policy set may belong to one of a set of mutually exclusive classes. Such classes may include classes of permission, action, and/or other classes. Attributes of a permission class may include "Allowed," "Denied," and/or other permission class attributes. Attributes of an action class may include "Read," "Write," "Update," "Delete," and/or other action class attributes. For an individual set of computing resources 102, a policy administrator may define non-categorical attributes. Non-categorical attributes may represent one or more subjects (e.g. Doctor and/or Alice), context (e.g. location and/or time), and/or other non-categorical information. Individual sets of computing resources 102 may include different non-categorical attributes.

The policy database 104 may include electronic storage media that electronically stores information. The electronic storage media of the policy database 104 may include one or both of system storage that is provided integrally (i.e., substantially non-removable) with a computing platform that includes the policy database 104 and/or removable storage that is removably connectable to such a computing platform via, for example, a port (e.g., a USB port, a firewire port, etc.) or a drive (e.g., a disk drive, etc.). The policy database 104 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The policy database 104 may store software algorithms, information determined by processor(s), information received from user interface(s), information received from other resources and/or component of the system 100, and/or other information that enables the system 100 to function as described herein.

The policy validation computing platform 106 may be configured to validate and/or verify consistency and/or completeness of an access control policy set, in accordance with one or more implementations. Such an access control policy set may be associated with one or more of the computing resources 102 and may be stored by the policy database 104. As depicted in FIG. 1, the policy validation computing platform 106 may include a user interface 108, electronic storage 110, one or more processors 112, and/or other components.

The user interface 108 may provide an interface between the system 100 and one or more users (e.g., policy administrator). The user interface 108 may enable data, results, and/or instructions and any other communicable items, collectively referred to as "information," to be communicated between the user and the system 100. Examples of interface devices suitable for inclusion as a user interface include a keypad, buttons, switches, a keyboard, knobs, levers, a display screen, a touch screen, speakers, a microphone, an indicator light, an audible alarm, and a printer. In some implementations, the user interface 108 includes a plurality of separate interfaces.

It is to be understood that other communication techniques, either hard-wired or wireless, are also contemplated by the present invention as the user interface 108. For example, the present technology contemplates that the user interface 108 may be integrated with a removable storage interface provided by electronic storage 110 (described further below). In this example, information may be loaded into the policy validation computing platform 106 from removable storage (e.g., a smart card, a flash drive, a removable disk, etc.) that enables the user(s) to customize the implementation of the system 100. Other exemplary input devices and techniques adapted for use with system 100 as the user interface 108 may include, but are not limited to, an RS-232 port, RF link, an IR link, modem (telephone, cable or other). In short, any technique for communicating information with the system 100 is contemplated by the present technology as the user interface 108.

The electronic storage 110 may comprise electronic storage media that electronically stores information. The electronic storage media of the electronic storage 110 may include one or both of system storage that is provided integrally (i.e., substantially non-removable) with the policy validation computing platform 106 and/or removable storage that is removably connectable to the policy validation computing platform 106 via, for example, a port (e.g., a USB port, a firewire port, etc.) or a drive (e.g., a disk drive, etc.). The electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may store software algorithms, information determined by the processor(s) 112, information received from the user interfaces 108, information received from other resources and/or components of the system 100, and/or other information that enables the system 100 to function as described herein.

The processor(s) 112 may be configured to provide information processing capabilities in the policy validation computing platform 106. As such, the processor(s) 112 may include one or more of a digital processor, an analog processor, a digital circuit designed to process information, an analog circuit designed to process information, a state machine, and/or other mechanisms for electronically processing information. Although the processor(s) 112 is shown in FIG. 1 as a single entity, this is for illustrative purposes only. In some implementations, the processor(s) 112 may include a plurality of processing units. These processing units may be physically located within the same device, or the processor(s) 112 may represent processing functionality of a plurality of devices operating in coordination.

The processor(s) 112 may be configured to execute one or more computer program modules. The one or more computer program modules may include one or more of a policy import module 114, a parser module 116, a transformation module 118, a decision tree module 120, an anomaly detection module 122, a remediation module 124, and/or other modules. The processor(s) 112 may be configured to execute modules 114, 116, 118, 120, 122, and/or 124 by software; hardware; firmware; some combination of software, hardware, and/or firmware; and/or other mechanisms for configuring processing capabilities on the processor(s) 112.

It should be appreciated that although modules 114, 116, 118, 120, 122, and 124 are illustrated in FIG. 1 as being co-located within a single processing unit, in implementations in which the processor(s) 112 includes multiple processing units, one or more of modules 114, 116, 118, 120, 122, and/or 124 may be located remotely from the other modules. The description of the functionality provided by the different modules 114, 116, 118, 120, 122, and/or 124 described below is for illustrative purposes, and is not intended to be limiting, as any of modules 114, 116, 118, 120, 122, and/or 124 may provide more or less functionality than is described. For example, one or more of modules 114, 116, 118, 120, 122, and/or 124 may be eliminated, and some or all of its functionality may be provided by other ones of modules 114, 116, 118, 120, 122, and/or 124. As another example, the processor(s) 112 may be configured to execute one or more additional modules that may perform some or all of the functionality attributed below to one of modules 114, 116, 118, 120, 122, and/or 124.

The policy import module 114 may be configured to import and/or otherwise receive access control policies. Access control policies may be imported and/or otherwise received from the policy database 104. According to some implementations, access control policies received by the policy import module 114 may require some level of formatting. Such formatting may include ordering attributes, transforming Boolean expressions, and/or other formatting.

The parser module 116 may be configured to parse a set of access control policies. According to some implementations, such parsing may be based on non-categorical attributes. As mentioned above, policies may be described as ordered collections of attributes. Ordering of attributes may be necessary when a policy set is not given in tabular form. For example, in some implementations, policies may be imported from the policy database 104 in extensible markup language (XML) form and/or other non-tabular forms. In such implementations, the parser module 116 may be configured to determine the attributes and the corresponding attribute values from an imported XML file, and place those attributes in an ordered form. To illustrate, the following sample XML file, which contains two policies (i.e., rules), may be used as input to the parser module 116.

```
<?xml version="1.0" ?>
<Rules>
    <rule>
        <Subject>Alice</Subject>
        <Role>Nurse</Role>
        <Object>MedRec</Object>
        <Action>Read</Action>
        <Permission>Allowed</Permission>
    </rule>
    <rule>
        <Subject>Bob</Subject>
        <Role>Doctor</Role>
        <Object>MedRec</Object>
        <Action>Write</Action>
        <Permission>Allowed</Permission>
    </rule>
</Rules>
```

From the above sample XML file, the parser module 116 may generate a tabular structure of policy data, as presented in Table 1. This tabular structure of policy data may be used as input for the decision tree module 120, which is described further below.

TABLE 1

| Subject | Role | Object | Action | Permission |
| --- | --- | --- | --- | --- |
| Alice | Nurse | MedRec | Read | Allowed |
| Bob | Doctor | MedRec | Write | Allowed |

A policy administrator may specify one or more contextual conditions on one more attributes. Examples of contextual conditions may include location, time, and/or other contextual conditions. Privileges may be granted when all such contextual conditions are satisfied. In an access control policy, contextual conditions may be defined as a Boolean expression. A policy containing a Boolean expression may be generally expressed as $$\forall s \in S, \forall a \in A, \forall o \in O, (\text{BooleanExpression}) \rightarrow \text{Privilege}, \quad (\text{EQN 1})$$

where S is a set of subjects, A is a set of actions, O is a set of objects, and Privilege may have a valued of "Allowed" or "Denied." As noted above, policies may be defined in terms of attributes. Here, subject, action and object may be represented as independent attributes. A Boolean expression, however, may be composed of multiple attributes. Relationships between multiple attributes may be defined using logical operators such as AND, OR, and/or other logical operators.

The transformation module 118 may be configured to transform Boolean expressions into a normalized form. Examples of normalized forms may include a disjunctive normal form and/or other normalized forms associated with Boolean logic. A disjunctive normal form is a standardization of a logical formula that is a disjunctive of conjunctive clauses. In order to represent a Boolean expression in a decision tree, according to some implementations, the Boolean expression may first be transformed into a disjunctive normal form. This may be due to the fact that a decision tree that is generated with using a data classification algorithm naturally encodes a disjunctive normal form tautology.

To illustrate, a policy is considered that states that the subject Alice is permitted to perform action Read on object Database if the following Boolean expression is satisfied.

R1: IF Subject (Alice) and Action (Read) and Object (Database) and [(Day(MON) OR Day(TUE)) AND Location(Office)) OR Role(Admin)] Then Permission (Allowed)

The transformation module 118 may transform the Boolean expression associated with policy R1 into a disjunctive normal form. As such, the policy R1 may be split into three policies (i.e., R1.1, R1.2, and R1.3), as shown below.

R1.1: IF Subject(Alice) and Action(Read) and Object(Database) and Role(Admin) Then Permission(Allowed)
R1.2: IF Subject(Alice) and Action(Read) and Object(Database) and Day(MON) and Location (Ward) Then Permission(Allowed)
R1.3: IF Subject(Alice) and Action(Read) and Object(Database) and Day(TUE) and Location (Ward) Then Permission(Allowed)

These three policies may be represented as tabular policy data, as shown in Table 2. The tabular structure of policy data shown in Table 2 may be used as input for the decision tree module 120, which is described further below.

TABLE 2

| Subject | Action | Object | Day | Location | Role | Permission |
| --- | --- | --- | --- | --- | --- | --- |
| Alice | Read | Database | — | — | Admin | Allowed |
| Alice | Read | Database | MON | Ward | — | Allowed |
| Alice | Read | Database | TUE | Ward | — | Allowed |

The decision tree module 120 may be configured to generate a decision tree. Such a decision tree may be generated based on tabular policy data from the parser module 116 and/or the transformation module 118, and/or other data. According to some implementations, a process of decision tree creation may start with a single node representing all data. If all cases in a data set belong to the same class, then the node may become a leaf labeled with a class label. Otherwise, an algorithm may select an attribute according to the following criteria: (1) for each attribute A, find the normalized information gain from splitting on A; (2) let $A_{best}$ be the attribute with the highest normalized information gain; (3) create a decision node that splits on $A_{best}$; and (4) recur on the sub-lists obtained by splitting on $A_{best}$, and add those nodes as children of current node.

To illustrate, a data set S containing two classes P and N may be considered. The information gain for an attribute A may be is determined as $$\text{gain}(A) = I(S_P, S_N) - E(A), \quad (\text{EQN 2})$$

where $I(S_P, S_N)$ represents the amount of information needed to decide if an arbitrary example in S belongs to P or N, and E(A) represents the information needed to classify objects in all sub-trees. $I(S_P, S_N)$ may be defined as $$I(S_P, S_N) = -\frac{x}{x+y}\log_2\frac{x}{x+y} - \frac{y}{x+y}\log_2\frac{y}{x+y}, \quad (\text{EQN 3})$$

where x is the number of elements in class P and y is the number of elements in class N. To further the present illustration, an attribute A may be considered as the root in the tree such that S will partition in sets $\{S_1, S_2, \ldots S_v\}$. If $S_i$ contains $x_i$ examples of P and $y_i$ examples of N, then E(A) may be determined as $$E(A) = \sum_{i=1}^{v} \frac{x_i + y_i}{x+y} I(S_P, S_N). \quad (\text{EQN 4})$$

For illustrative purposes, again, the access control policy set presented in Table 3 is considered. The decision tree module 120 may apply an algorithm to the access control policy set presented in Table 3 to generate a decision tree. According to some implementations, the decision tree module 120 may utilize the ID3 algorithm, the C4.5 algorithm and/or other algorithms derived or extended from the ID3 algorithm, and/or other algorithms configured to generate decision trees.

TABLE 3

| Subject | Resource | Action | Permission |
| --- | --- | --- | --- |
| Alice | File 1 | Read | Allowed |
| Alice | File 1 | Write | Denied |
| Alice | File 1 | Delete | Denied |
| Alice | File 2 | Read | Allowed |
| Bob | File 1 | Delete | Denied |

TABLE 3-continued

| Subject | Resource | Action | Permission |
|---|---|---|---|
| Bob | File 1 | Write | Denied |
| Bob | File 1 | Read | Allowed |
| Bob | File 2 | Write | Allowed |

Figure 2A:
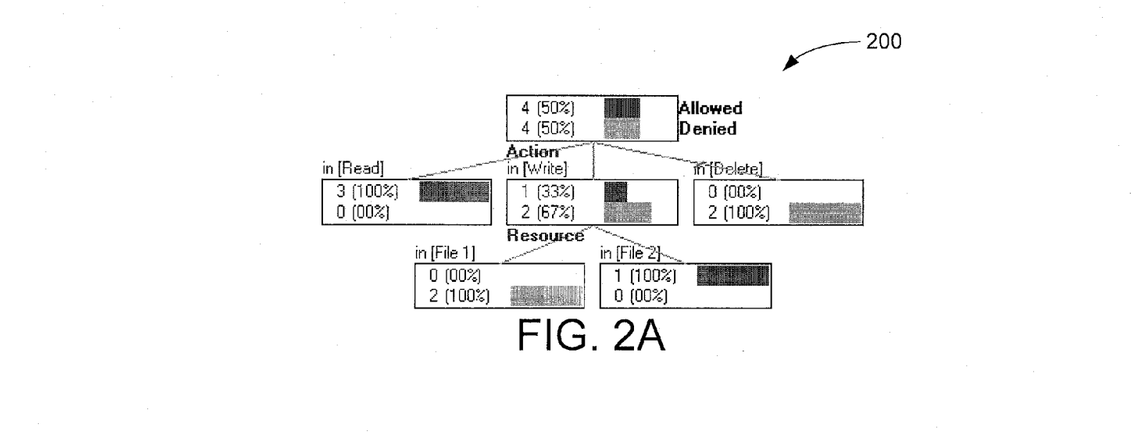
FIG. 2A illustrates an exemplary decision tree generated based on the C4.5 algorithm, in accordance with one or more implementations.

FIG. 2A illustrates an exemplary decision tree 200 generated based on the C4.5 algorithm being applied to the access control policy set presented in Table 3. In FIG. 2A, the attribute that provides the most information gain (i.e., Action) appears first in the decision tree 200. Consequently, optimized or compact trees may be generated in which some attributes may not appear. In accordance with some implementations, however, all attributes should be present in the decision tree to convey a complete picture of the policy domain for purposes of anomaly detection, which is described further in connection with the anomaly detection module 122.

In order to assure that all attributes are present in the decision tree, the following condition should hold true:

$$T_\alpha \geq A_{r_1} + 1 \quad \text{(EQN 5)}$$

where T represents the depth (levels) of the decision tree, $A_{r_1}$ the total number of non-category attributes defined for resource i, and 1 is for the root node which represents the category attribute. The condition set forth above may be obtained by making the following modifications to the C4.5 algorithm: for each attribute that does not already appear in the decision tree (1) calculate the information gain that results from splitting on that attribute and (2) split on the attribute that gives the lowest information gain.

Figure 2B:
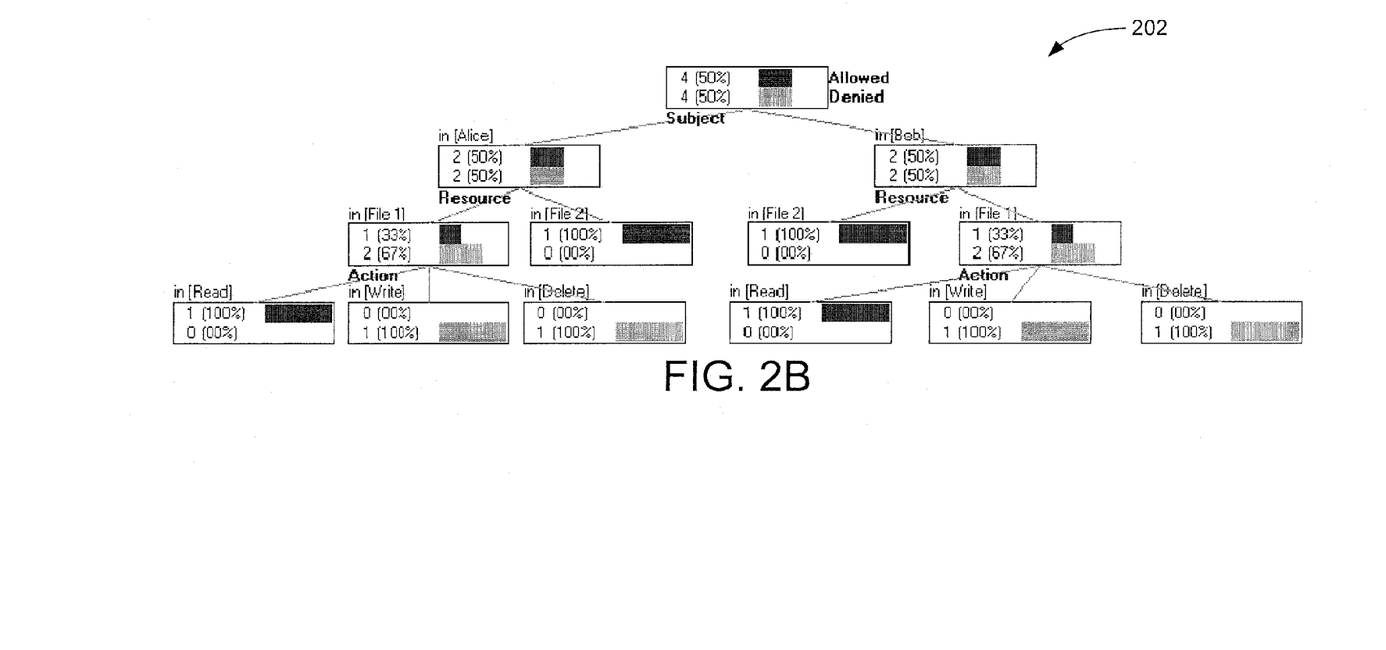
FIG. 2B illustrates an exemplary decision tree generated based on a modified C4.5 algorithm, in accordance with one or more implementations.

FIG. 2B illustrates an exemplary decision tree 202 generated based on the modified C4.5 algorithm being applied to the access control policy set presented in Table 3. In FIG. 2B, the attribute that gives the lowest information gain (i.e., Subject) appears on the top of the decision tree 202. Because of this, a more complete tree may be obtained as compared to the standard C4.5 algorithm (note that the subject attribute does not appear in the decision tree 200 of FIG. 2A). According to some implementations, a more complete decision tree (e.g., the decision tree 202 compared to the decision tree 200) may be more useful in detecting inconsistencies and incompleteness in an access control policy set, described further in connection with the anomaly detection module 122.

The anomaly detection module 122 may be configured to detect one or more anomalies (e.g., inconsistencies and/or incompleteness) in an access control policy set. To do this, the anomaly detection module 122 may be configured to identify one or more policies from a decision tree and assign an accuracy value to individual policies. According to some implementations, the anomaly detection module 122 may apply one or more algorithms to a given decision tree to detect inconsistencies and/or incompleteness in access control policies. It is noteworthy that, in a decision tree, each branch $b_i$ (from the root to a terminal node) may represent one policy.

Anomalies (e.g., inconsistency and/or incompleteness) may be detected by the anomaly detection module 122, in some implementations, by analyzing the terminal nodes of a decision tree. As mentioned above, in a decision tree, each branch (from the root to a terminal node) represents one policy. If a terminal node exactly contains one class attribute (i.e., Allowed or Denied), then the accuracy value of the corresponding policy is one. If a terminal node does not contain any class attribute, then the accuracy value of the corresponding policy is zero. If more than one class attribute exists at a single terminal node, then the accuracy value may be calculated as follows:

$$A_{r_i} = \frac{1}{T_{cl.att.}}, \quad \text{(EQN 6)}$$

where $1/T_{cl.att.}$ is the total number of class attributes at terminal node i. For example, if two class attributes exist at a single terminal node, then the accuracy value is one half. By way of this analysis, an accuracy value $A_r$ may be associated with each policy in the access control policy set. Thus, a policy that is inconsistent with other policies or incomplete may be identified by the following function:

$$M(A_{r_i}) = \begin{cases} \text{consistent} & \text{if } A_{r_i} = 1 \\ \text{inconsistent} & \text{if } 0 < A_{r_i} < 1 \\ \text{incomplete} & \text{if } A_{r_i} = 0 \end{cases} \quad \text{(EQN 7)}$$

When the accuracy value of any policy is between zero and one, $1/A_{r_i}$ policies in the access control policy set may be mutually inconsistent.

The specific conflicting policies in the access control policy set may be identified. All of the attributes of a given policy, except class attributes (e.g., permission and/or action), may be fetched. The access control policy set may be scanned to identify the policies in the access control policy set that contain the attributes of the given policy. If the accuracy value of an identified policy is zero, no explicit policy may be defined in specific context for a particular subject. Information about that subject and context associated with that subject may be fetched from the given policy.

According to some implementations, in order to detect anomalies (e.g., inconsistency and/or incompleteness), an algorithm that functions similarly to the algorithm outlined below may be applied to a decision tree.

```
1:   Let A(b_i) be the set of all attributes present in one
         branch.
2:   Bool consistent = true;
3:   Bool complete = true;
4:   for each branch b_i in Decision tree do
5:       if more than 1 category attribute is assigned to terminal
             node b_i.t_node then
6:           A(b_i) = fetch_all_attributes_of_branch(b_i) ;
7:           for each actual rule R_a in the policy set do
8:               if v(A(R_a)) = v(A(b_i)) then
9:                   Highlight: R_a : A_1 ^ ... ^ A_n → C;
10:              end if
11:          end for
12:          consistent = false;
13:      end if
14:      if no category attribute is assigned to terminal node
             b_i.t_node then
15:          A(b_i) = fetch_all_attributes_of_branch(b_i) ;
16:          Policy set is incomplete w.r.to label(b_i.t_node) ;
17:          Complete context: A(b_i) ;
18:          complete = false;
19:      end if
20:  end for
21:  if consistent = true then
22:      No inconsistency found;
23:  end if
24:  if complete = true then
25:      No incompleteness found;
26:  end if
```

According to the algorithm outlined above, the terminal node ($t_{node}$) of each branch may be checked. If any terminal node contains more than one category (C) attribute value, some access control policies in the inputted access control policy set are mutually inconsistent (see, e.g., line 5). In order to determine which particular access control policies in the access control policy set are mutually inconsistent, all of the attributes of the particular branch may be fetched (see, e.g., line 6). Next, the attribute values in the access control policy set may be searched (see, e.g., lines 7-11). Individual policies in the access control policy set that contain those attribute values may be identified as inconsistent (see, e.g., lines 8-10). If any terminal node does not contains any category (C) attribute value (see, e.g., line 14), no explicit policy is defined in the specific context for the particular subject (see, e.g., line 17). Information about subject and context may be fetched from the complete branch (i.e., root to terminal node) (see, e.g., line 15). If in a complete decision tree, each terminal node contains exactly one category attribute, then the access control policy set is complete and consistent (see, e.g., lines 21-26).

The remediation module 124 may be configured to provide results of the anomaly detection module 122 for presentation to a policy administrator. The results of the anomaly detection module 122 may be presented to the policy administrator via the user interface 108. In some implementations, inconsistent and/or incomplete policies may be highlighted or otherwise emphasized when presented to the policy administrator. The remediation module 124 may be configured to facilitate remediation of inconsistencies and/or incompleteness of policies in the access control policy set. Inconsistencies and/or incompleteness of policies in the access control policy set may be remediated via the user interface 108. Remediation may include completing an incomplete policy, making inconsistent policies consistent with other policies, and/or other remediation measures.

Figure 3:
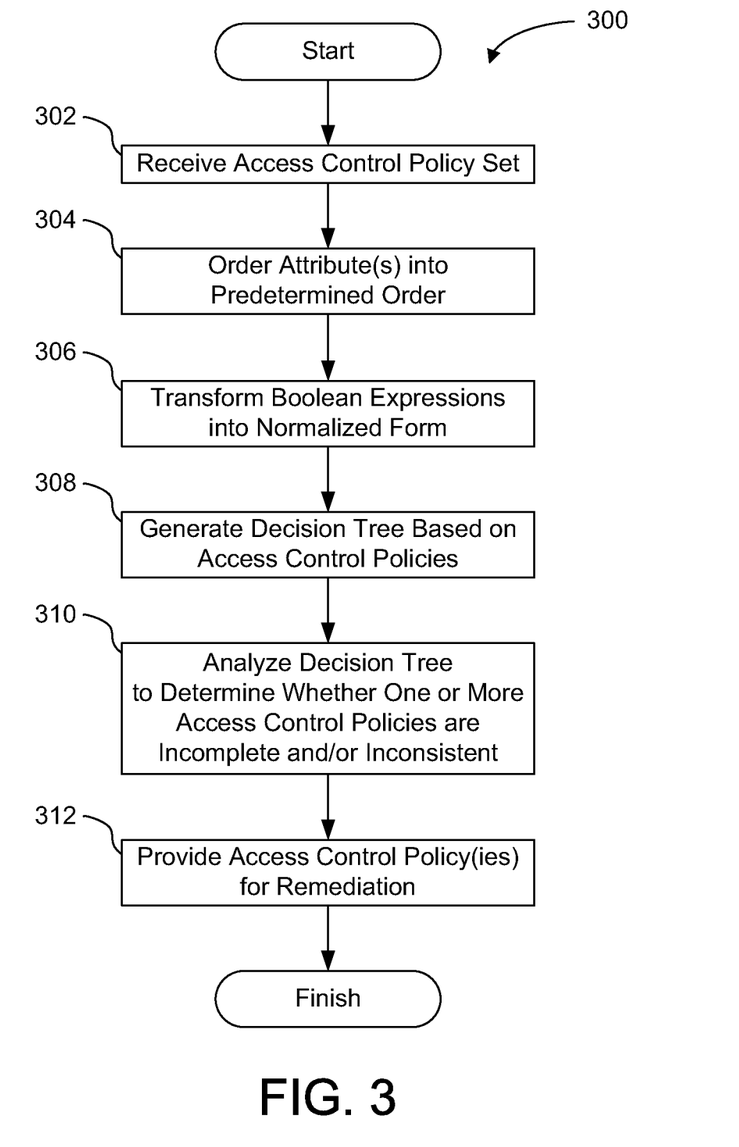
FIG. 3 illustrates a method for validating and/or verifying consistency and/or completeness of an access control policy set, in accordance with one or more implementations.

FIG. 3 is a flowchart illustrating a method 300 for validating and/or verifying consistency and/or completeness of access control policy sets, in accordance with one or more implementations. The operations of the method 300 presented below are intended to be illustrative. In some implementations, the method 300 may be accomplished with one or more additional operations not described, and/or without one or more of the operations discussed. Additionally, the order in which the operations of the method 300 are illustrated in FIG. 3 and described below is not intended to be limiting.

In some implementations, the method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 300 in response to instructions stored electronically on an electronic storage medium. The one or more processing devices may include one or more devices configured through hardware, firmware, and/or software to be specifically designed for execution of one or more of the operations of the method 300.

At operation 302, an access control policy set is received. The access control policy set may include access control policies that allow or disallow access to computing resources. Individual ones of the access control policies may include one or more attributes. The policy import module 114 may perform operation 302, in some implementations.

At operation 304, the one or more attributes of a given access control policy are ordered into a predetermined order responsive to the one or more attributes of the given access control policy lacking the predetermined order. The parser module 116 may perform operation 304, in some implementations.

At operation 306, one or more Boolean expressions, if any, are transformed into a normalized form. The transformation module 118 may perform operation 306, in some implementations.

At operation 308, a decision tree is generated based on the access control policies. The decision tree module 120 may perform operation 308, in some implementations.

At operation 310, the decision tree is analyzed. The decision tree may be analyzed to determine one or more of (1) whether one or more of the access control policies are incomplete, or (2) whether one or more of the access control policies are inconsistent with one or more other ones of the access control policies. The anomaly detection module 122 may perform operation 310, in some implementations.

At operation 312, one or more of the access control policies is provided, for presentation to a policy administrator, for remediation. The one or more access control policies may be provided for remediation responsive to one or more of (1) a positive determination that one or more of the access control policies are incomplete, or (2) a positive determination that one or more of the access control policies are inconsistent with one or more other ones of the access control policies. The remediation module 124 may perform operation 312, in some implementations.

Although the present technology has been described in detail for the purpose of illustration based on what is currently considered to be the most practical and preferred implementations, it is to be understood that such detail is solely for that purpose and that the present technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method to validate and/or verify consistency and/or completeness of access control policy sets, the method comprising:
    receiving, by a processor comprising hardware, an access control policy set, the access control policy set including access control policies that allow or disallow access to computing resources, individual one or more of the access control policies including attributes;
    ordering the attributes of a given access control policy into a predetermined order responsive to the attributes of the given access control policy lacking the predetermined order;
    generating a decision tree based on the access control policies; and
    analyzing, by a processor comprising hardware, the decision tree to determine one or more of (1) whether one or more of the access control policies are incomplete, or (2) whether one or more of the access control policies are inconsistent with one or more other ones of the access control policies.

2. The method of claim 1, wherein the received access control policy set includes one or more access control policies in an XML form.

3. The method of claim 1, wherein the predetermined order is a tabular form.

4. The method of claim 1, wherein ordering the attributes includes parsing the access control policies based on non-categorical attributes.

5. The method of claim 1, wherein one or more of the access control policies include a Boolean expression, the Boolean expression defining a relationship between attributes.

6. The method of claim 5, further comprising transforming the Boolean expression into a normalized form.

7. The method of claim 6, wherein the normalized form includes a disjunctive normal form.

8. The method of claim 5, further comprising transforming the Boolean expression into two or more other Boolean expressions.

9. The method of claim 5, further comprising converting the Boolean expression into a tabular form.

10. The method of claim 1, wherein generating the decision tree includes applying an algorithm configured to generate the decision tree based on the access control policies.

11. The method of claim 10, wherein the algorithm configured to generate the decision tree includes a C4.5 algorithm.

12. The method of claim 1, wherein the decision tree includes terminal nodes, and wherein analyzing the decision tree includes determining a number of category attribute values included in each of the terminal nodes.

13. The method of claim 12, wherein one or more of the access control policies are identified as inconsistent responsive to a determination that one or more of the terminal nodes contain more than one category attribute value.

14. The method of claim 12, wherein one or more of the access control policies are identified as incomplete responsive to a determination that one or more of the terminal nodes contain zero category attribute values.

15. The method of claim 12, wherein the access control policies are determined to be consistent and complete responsive to a determination that each of the terminal nodes contain one category attribute value.

16. The method of claim 1, further comprising providing, for presentation to a policy administrator, one or more of the access control policies for remediation responsive to one or more of (1) a positive determination that one or more of the access control policies are incomplete, or (2) a positive determination that one or more of the access control policies are inconsistent with one or more other ones of the access control policies.

17. A system configured to validate and/or verify consistency and/or completeness of an access control policy set, the system comprising:

a processor, comprising hardware, configured to execute computer program modules, the computer program modules comprising:

a policy import module configured to receive an access control policy set, the access control policy set including access control policies that allow or disallow access to computing resources, individual one or more of the access control policies including attributes;

a parser module configured to order the attributes of a given access control policy into a predetermined order responsive to the attributes of the given access control policy lacking the predetermined order;

a decision tree module configured to generate a decision tree based on the access control policies; and an anomaly detection module configured to analyze the decision tree to determine one or more of (1) whether one or more of the access control policies are incomplete, or (2) whether one or more of the access control policies are inconsistent with one or more other ones of the access control policies.

18. The system of claim 17, further comprising a transformation module configured to transform a Boolean expression into a disjunctive normal form, wherein one or more of the access control policies include the Boolean expression, the Boolean expression defining a relationship between attributes.

19. The system of claim 17, further comprising a remediation module configured to provide, for presentation to a policy administrator, one or more of the access control policies for remediation responsive to one or more of (1) a positive determination by the anomaly detection module that one or more of the access control policies are incomplete, or (2) a positive determination by the anomaly detection module that one or more of the access control policies are inconsistent with one or more other ones of the access control policies.

20. A non-transitory computer-readable storage medium having instructions embodied thereon, the instructions being executable by a processor to perform a method to validate and/or verify consistency and/or completeness of access control policy sets, the method comprising:

receiving an access control policy set, the access control policy set including access control policies that allow or disallow access to computing resources, individual one or more of the access control policies including attributes;

ordering the attributes of a given access control policy into a predetermined order responsive to the attributes of the given access control policy lacking the predetermined order;

generating a decision tree based on the access control policies; and analyzing the decision tree to determine one or more of (1) whether one or more of the access control policies are incomplete, or (2) whether one or more of the access control policies are inconsistent with one or more other ones of the access control policies.

* * * * *